United States Patent
Benitez et al.

(10) Patent No.: US 6,941,325 B1
(45) Date of Patent: Sep. 6, 2005

(54) MULTIMEDIA ARCHIVE DESCRIPTION SCHEME

(75) Inventors: Ana B. Benitez, New York, NY (US); Alejandro Jaimes, New York, NY (US); Paek Seungyup, New York, NY (US); Shih-Fu Chang, New York, NY (US); Chung-Sheng Li, Ossining, NY (US); John R. Smith, New York, NY (US)

(73) Assignees: The Trustees of Columbia University, New York, NY (US); IBM Thomas J. Watson Search Center, York Town Heights, NY (US)

( * ) Notice: Subject to any disclaimer, the term of this patent is extended or adjusted under 35 U.S.C. 154(b) by 0 days.

(21) Appl. No.: 09/889,859

(22) PCT Filed: Feb. 1, 2000

(86) PCT No.: PCT/US00/02488

§ 371 (c)(1),
(2), (4) Date: Jan. 8, 2002

(87) PCT Pub. No.: WO00/45307

PCT Pub. Date: Aug. 3, 2000

Related U.S. Application Data

(60) Provisional application No. 60/118,026, filed on Feb. 1, 1999, provisional application No. 60/142,327, filed on Jul. 3, 1999, provisional application No. 60/118,020, filed on Feb. 1, 1999, and provisional application No. 60/118,027, filed on Feb. 1, 1999.

(51) Int. Cl.$^7$ .............................................. G06F 17/30
(52) U.S. Cl. .................. 707/200; 707/100; 707/103 R; 707/104.1; 709/219; 709/224; 345/440; 345/763
(58) Field of Search .................. 707/1–6, 100–102, 707/103 R, 104.1, 200; 709/219, 224; 706/45, 52, 55; 345/440, 763

(56) References Cited

U.S. PATENT DOCUMENTS

| | | | | |
|---|---|---|---|---|
| 5,546,571 A | * | 8/1996 | Shan et al. ..................... | 707/3 |
| 5,555,378 A | * | 9/1996 | Gelman et al. ............. | 709/235 |
| 5,664,177 A | * | 9/1997 | Lowry ......................... | 707/100 |
| 5,721,815 A | * | 2/1998 | Ottesen et al. .............. | 345/721 |
| 5,852,435 A | * | 12/1998 | Vigneaux et al. ........... | 345/428 |
| 5,884,298 A | * | 3/1999 | Smith et al. .................. | 707/2 |
| 6,070,228 A | * | 5/2000 | Belknap et al. ............. | 711/118 |
| 6,092,072 A | * | 7/2000 | Guha et al. ................. | 707/101 |
| 6,549,911 B2 | * | 4/2003 | Gustman .................... | 707/102 |
| 6,556,958 B1 | * | 4/2003 | Chickering ................... | 703/2 |
| 6,581,058 B1 | * | 6/2003 | Fayyad et al. ................ | 707/6 |

* cited by examiner

*Primary Examiner*—Charles Rones
*Assistant Examiner*—Jacques Veillard
(74) *Attorney, Agent, or Firm*—Baker Botts L.L.P.

(57) ABSTRACT

A multimedia archive description scheme is provided for characterizing a multimedia archive having records and associated record descriptions. The multimedia archive description scheme provides a data structure which relates records by similarity measures. The principle data structure in the multimedia archive description scheme is a cluster. A cluster includes one or more attributes of the records in the archive and can include one or more cluster relationships. Cluster attributes can include feature space attributes, semantic attributes, media attributes and meta attributes of the records in the archive. The cluster relationships can relate records to clusters or clusters to clusters. Cluster relationships can include feature space (syntactic) relationships, semantic relationships, media relationships and meta relationships. The multimedia archive description scheme provides an efficient form for describing a collection of records.

42 Claims, 12 Drawing Sheets

FEATURE SPACE X

CLUSTER DECOMPOSITION

SUBJECT SPACE

CLUSTER DECOMPOSITION

| Types of attributes | | Levels | Examples |
|---|---|---|---|
| Semantic | Lexical | | |
| | Synonymy<br>*To be Similar to* | Generic | That apple is like that orange |
| | | Specific | That apple has as many calories as that orange |
| | | Abstract | That apple is as nutritious as that orange |
| | Antonymy<br>*To be opposite to* | Generic | That man is different from that woman |
| | | Specific | That man is 20-pound heavier than that woman |
| | | Abstract | That man is uglier than that woman |
| | Hyponymy -<br>Hypernymy<br>*To be a - To be a type of* | Generic | A dog is an animal |
| | | Specific | A dog is a mammal animal |
| | | Abstract | A dog is a playful animal |
| | Meronymy -<br>Holonymy<br>*To be a part /member of - To be the whole of* | Generic | Peter is a member of a team |
| | | Specific | Peter is an outfielder for the Yankees |
| | | Abstract | Peter is the best outfielder in the Yankees' history |
| | Predicative | | |
| | Action/<br>Event | Generic | The boys are playing with the girls |
| | | Specific | The boys are playing soccer with the girls |
| | | Abstract | The boys are playing soccer well with the girls |
| | State | Generic | The girl owns stock from that company |
| | | Specific | The girl owns 80% of the stock from the company |
| | | Abstract | The girl controls the company |

FIG. 7

| Types of relationships | | | Levels | Examples |
|---|---|---|---|---|
| Syntactic | Feature Spatial | Topological | Generic | • Near from, Far From, Adjacent to, Contained in, Composed of, Consist of |
| | | | Specific | • The union of, The intersection of, The negation of<br>• Distance of centroids .4, Intersection of clusters in feature space X |
| | | Directional | Generic | • To the direction of increasing feature A of the feature space AB, To the directional of decreasing feature B |
| | | | Specific | • Angle between centroids of clusters in feature space X |
| | Spatial | Topological | Generic | • Near from, Far from, Adjacent to, Contained in, Composed of, Consist of |
| | | | Specific | • The union, The intersection, The negation<br>• 0.5 inches from, The intersection of two regions |
| | | Directional | Generic | • Left of, Top of, Upper left of, Lower right of, Behind<br>• 2D String |
| | | | Specific | • The union, The intersection, The negation<br>• 20 degrees north from, 40 degrees east from, the union of two segments |
| | Temporal | Topological | Generic | • Co-begin, Parallel, Sequential, Overlap, Adjacent, Within, Composed, Consist of |
| | | | Specific | • 20 min. apart from, Overlapping 20 sec. |
| | | Directional | Generic | • Before, After |
| | | | Specific | • 20 min. after |
| | Visual | Global | Generic | • More random, Less normal, More scattered<br>• Smother than, Darker than, More yellow than, Similar texture, Similar Color |
| | | | Specific | • Difference in variance of cluster, Difference in size of cluster, Difference in compactness of cluster<br>• Distance in texture feature, Distance in color histogram |
| | | Local | Generic | • Faster than, To grow slower than, Similar speed, Similar shape<br>• Cluster more random on an feature axis direction |
| | | | Specific | • 20 miles/hour faster than, Grow 4 inches/sec. faster than<br>• Cluster variance on a feature axis direction |
| | | Composition | Generic | • More symmetric than (for the distribution of elements in the cluster too) |
| | | | Specific | • Distance in symmetry feature<br>• Indexing hierarchy based on symmetry feature |

FIG. 8

MULTIMEDIA ARCHIVE DESCRIPTION SCHEME

RELATED APPLICATIONS

This application claims the benefit of U.S. Provisional Applications, Serial No. 60/118,026 entitled MPEG-7 ARCHIVE DESCRIPTION SCHEME, filed on Feb. 1, 1999, Serial No. 60/142,327 entitled FUNDAMENTAL ENTITY-RELATIONSHIP MODELS FOR A MULTIMEDIA ARCHIVE DESCRIPTION SCHEME, filed on Jul. 3, 1999, Serial No. 60/118,020 entitled PROPOSAL FOR MPEG-7 IMAGE DESCRIPTION SCHEME, filed on Feb. 1, 1999, and Serial No. 60/118,027 entitled PROPOSAL FOR MPEG-7 VIDEO DESCRIPTION SCHEME, filed on Feb. 1, 1999.

FIELD OF THE INVENTION

The present invention relates generally to multimedia content description and more particularly relates to a description scheme for a collection of multimedia records, such as a multimedia archive.

BACKGROUND OF THE INVENTION

As multimedia content becomes increasingly pervasive, many applications will benefit from an interoperable archive description standard. One such application is the exchange of multimedia documents among heterogeneous audio-visual databases. For example, when a media company purchases multimedia information from a TV broadcaster, the purchaser usually acquires a large collection of multimedia records, which can include images, image segments, videos, video segments, audio content, documents, and the like. The existence of an archive and audio-visual document description standard would allow the purchasing company to take advantage not only of previous extracted features and annotations for each multimedia document, but also of the previous indexing of the whole multimedia collection. Therefore, the media company could minimize the cost of integrating the purchased content with existing content.

Media companies also have the problem of evaluating the content of a multimedia archive to determine what set of multimedia material is best suited for their purposes. One way to evaluate content is to browse the multimedia documents one by one and manually choose the most appropriate material. This solution is very time consuming and tedious. An appropriate description scheme for multimedia archives would enable applications to more efficiently browse the content of multimedia collections, even with content from different sources.

Metasearch engines, which are gateways linking users to multiple and distributed search engines, would also benefit from a multimedia archive description scheme. The operation of current metasearch engines is significantly restrained by the interface limitations of current search engines (e.g. query by example or by sketch and results are a flat list of documents).

Archive descriptions will provide significant advantages for the metasearcher in its interaction with multiple search engines. Such queries can involve large collections of multimedia documents. Queries by archive description will allow efficient matching of a multimedia collection in selected feature spaces without the need of exchanging the description of each multimedia document. The interests addressed by the archive content are also more likely to become evident when viewing a description of a collection of multimedia documents rather than an individual multimedia document.

Currently, multimedia standards, such as MPEG-7, include description standards for individual multimedia documents, but do not extend these standards to the description of collections or archives of multimedia documents. If such standards are adopted and search engines make them available to the metasearcher, a more efficient search solution of a multimedia archive can be obtained.

In view of the foregoing, there remains a need for a multimedia archive description scheme suitable for used with media standards, such as MPEG-7.

OBJECTS AND SUMMARY OF THE INVENTION

It is an object to provide an archive description scheme with indexing structures and elements to describe collections of multimedia content.

It is a further object to provide an archive description scheme which relates records in an archive in accordance with properties and descriptions of the records.

It is another object to provide an archive description scheme which relates records in accordance with attributes of the records and relationships between or among the records.

In accordance with the present invention, a system for generating a multimedia archive description has a digital storage subsystem for storing multimedia records and descriptions of the records in accordance with a media description scheme. A computer processor is operatively coupled to the digital storage subsystem. The computer processor can access the record descriptions in the digital storage subsystem and generate an archive description record. The archive description record has at least one cluster, which is a data structure relating at least two records, or at least two portions of a single record in the digital storage subsystem. The clusters are formed based on attributes of the record descriptions indicative of a similarity measure in the corresponding records. Cluster attributes are generated from the record descriptions and can include feature space attributes, semantic attributes, media attributes and meta attributes. The computer processor also generates, as part of the archive description record, a multimedia archive index, or collection structure, for the archive.

The system also includes archive description record storage which is operatively coupled to the computer processor for storing the archive description record. The archive description storage can be a separate data storage device or a section of computer readable media associated with the digital storage subsystem.

The clusters in the archive description record can further relate records in accordance with at least one cluster relationship. The cluster relationships can include feature space relationships, semantic relationships, media relationships and meta relationships. Cluster relationships can define relationships between a cluster and a record, between two or more records, or between two or more clusters.

A method in accordance with the present invention generates a description of the content of a multimedia collection, or archive, which has one or more media records and record descriptions associated with the records. The method includes evaluating the record descriptions to determine measures of similarity in at least two records in the archive based on the properties of the records and grouping elements based on these properties. The groupings can be performed automatically, semi-automatically or even manually. A cluster description record can then be generated reflecting the grouping of elements, in accordance with cluster attributes and cluster relationships. A multimedia archive index, or collection structure description scheme, is generated to relate the multimedia archive description to the records in the archive.

Also in accordance with the present multimedia archive description scheme is an archive description file for describing the content of a multimedia archive, having records and record descriptions associated with the records. The principal description element in the archive description file is a cluster. The cluster includes at least one cluster attribute which relates the records in accordance with a similarity measure found in the record descriptions. The clusters can be further defined with the inclusion of at least one cluster relationship.

In each of the embodiments above, the cluster attributes can include descriptors related to feature space attributes, semantic attributes, media attributes and meta attributes. The cluster relationships can include feature space relationships, semantic relationships, media relationships and meta relationships. Cluster relationships can define relationships between records, between records and clusters or between two or more clusters. The cluster attributes can be indexed in accordance with an information-based hierarchy wherein feature space attributes are indexed above semantic attributes in the information-based hierarchy. The feature space attributes can be selected from the group including type/technique attributes, global distribution attributes, local structure attributes and global composition attributes. The semantic attributes can be selected from the group consisting of generic object attributes, generic scene attributes, specific object attributes, specific scene attributes, abstract object attributes and abstract scene attributes. In a specific embodiment, the information-based hierarchy is a ten level index structure having a plurality of feature space levels and a plurality of semantic attribute levels, wherein the feature space attribute levels include a type/technique attribute level, a global distribution attribute level, a local structure attribute level and a global composition attribute level and wherein the semantic attribute levels include a generic object attribute level, a generic scene attribute level, a specific object attribute level, a specific scene attribute level, an abstract object attribute level and an abstract scene attribute level.

The cluster relationships can be selected from the group including feature space relationships, semantic relationships, media relationships and meta relationships. The feature space relationships can be further selected from the group including spatial relationships, temporal relationships, and visual relationships. The semantic relationships can be further selected from the group including lexical relationships and predictive relationships.

The systems, methods and archive description scheme described above can be used in a media archive system in accordance with the present invention. The media archive system includes a computer readable storage system for storing a plurality of media records. At least one media description engine is also provided for accessing media records stored in the computer readable storage system and for generating a media description record corresponding thereto. A cluster processor is operatively coupled to the computer readable storage system. The cluster processor accesses the media description records and generates an archive description record which includes at least one cluster relating at least two records stored in the storage system. A query processor can be provided and operatively coupled to the cluster processor to receive archive search parameters from a user and provide an archive search query to the cluster processor.

The cluster processor can generate the archive description record automatically or semi-automatically with varying degrees of user input. The archive description record can also be generated or modified by manually creating clusters based on cluster attributes and cluster relationships.

BRIEF DESCRIPTION OF THE DRAWING

Further objects, features and advantages of the invention will become apparent from the following detailed description taken in conjunction with the accompanying figures showing illustrative embodiments of the invention, in which

FIG. 7 is a table illustrating an index structure for semantic relationships for an exemplary multimedia archive description scheme;

FIG. 8 is a table illustrating an index structure for syntactic relationships for an exemplary multimedia archive description scheme;

DETAILED DESCRIPTION OF PREFERRED EMBODIMENTS

Figure 1:
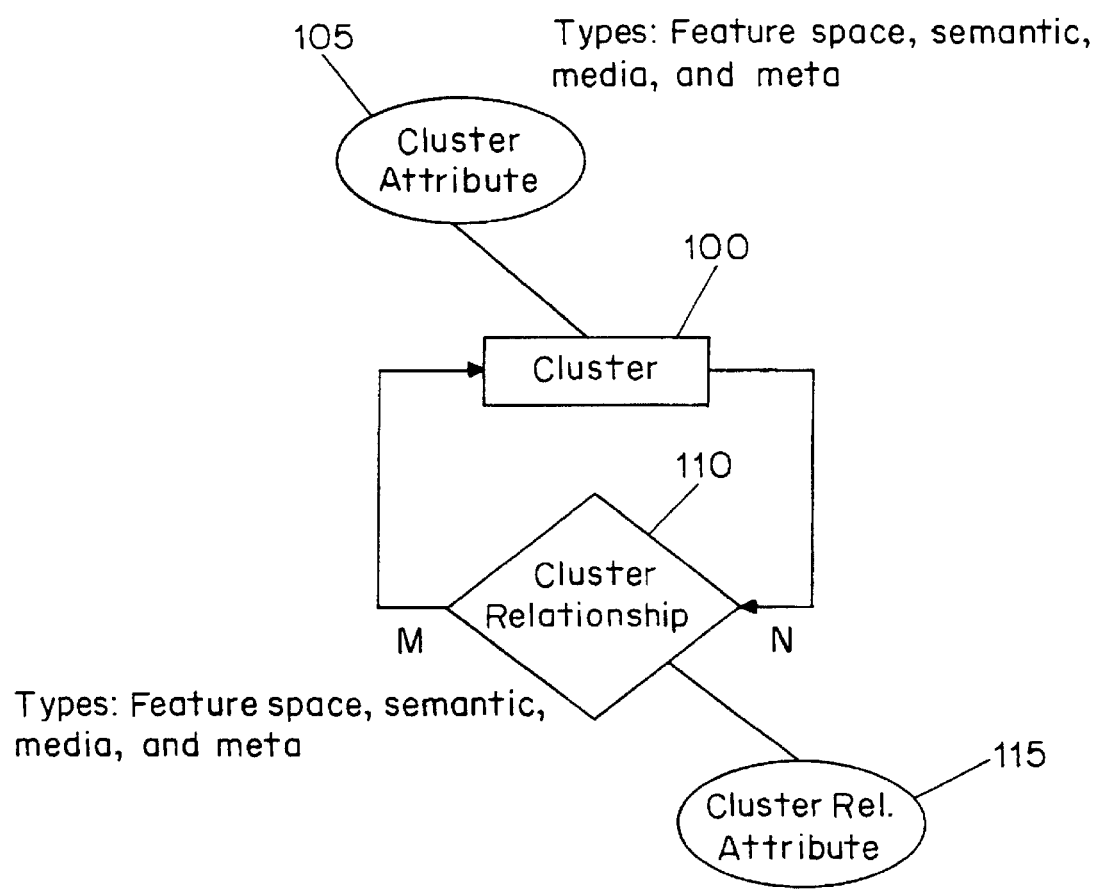
FIG. 1 is a simplified block diagram of a multimedia archive description scheme in accordance with the present invention.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

For the present multimedia archive description scheme, the nature of the multimedia records are not critical. As used herein, the terms multimedia document and multimedia record are synonymous and refer generically to any item of multimedia content, such as an image, an image object (e.g., a portion of an image), a video segment, an Internet web page including text and graphics (e.g., HTML and XML based multimedia content), and the like.

The present multimedia archive description schemes are generally applicable to systems and methods for describing collections of multimedia records where the individual records in the collection can be, or have been, described by a media description scheme for individual records, referred to herein generally as single record multimedia description schemes. Exemplary single record multimedia description schemes for various multimedia content, such as generic audio-video content, images and video are described in co-pending International Applications: PCT/US99/26125 entitled "Systems and Methods for Interoperable Multimedia Content Descriptions;" PCT/US99/26127 entitled "Image Description System and Method;" and PCT/US99/26126 entitled "Video Description System and Method;" respectively, which are incorporated herein by reference.

In general, multimedia records can be described as a set of elements, such as syntactic, semantic, meta and media elements. For example, an image can be described as a group of objects, with features and relationships associated with those objects. This description philosophy is extensible to a collection of multimedia documents, which can also be viewed as a set of elements that are further described by attributes of the elements and relationships to other elements.

The simplified block diagram of FIG. 1 illustrates the concept of the present multimedia archive description scheme. The primary unit of description in the present multimedia archive description scheme is a cluster 100. A cluster 100 represents a grouping of records in the archive based on the properties of the records which are set forth in descriptions of the records. A cluster 100 includes at least one cluster attribute 105 which describes a property of the cluster. Clusters can also include cluster relationships 110. Cluster relationships can be simple, one to one relationships such as between clusters, records, or record segments, or can be complex, m to n relationships between multiple clusters, records, or record segments. The cluster relationships 110 can be further defined by cluster relationship attributes 115.

A cluster 100 can be characterized in numerous ways, such as by statistics and distributions of its elements in different feature spaces, semantics associated with the cluster, media information, and meta information. Feature-space and semantic attributes can be used to describe the multimedia content in the cluster. Media and meta attributes generally convey to information that is closely related to the cluster, but not explicitly given by its content. Examples of this type of cluster attribute can include the identification of the cluster in a database or the method used to create a cluster. A cluster 100 can be created based on a vast number of combinations of attributes and/or relationships. Clusters can also be created based on human perception, which may not correspond to any combination of the attributes and relationships describing these elements.

Clusters 100 can be grouped to form other clusters, so composition and/or decomposition are possible relationships among clusters. More complex relationships involve relating the clusters based on their attributes 105, e.g., "color more random than." Relationships 110 among clusters can be defined for each cluster attribute type, e.g., syntactic feature space, semantic features, media, and meta.

Probabilities can also be assigned to relationships as a confidence factor of a stated association (e.g., "Object 1 is contained in Cluster A with probability 0.9"). Relationships can also relate clusters to elements of multimedia documents (e.g., "Cluster A is composed of Object 1 and Object 2").

Figure 2A:
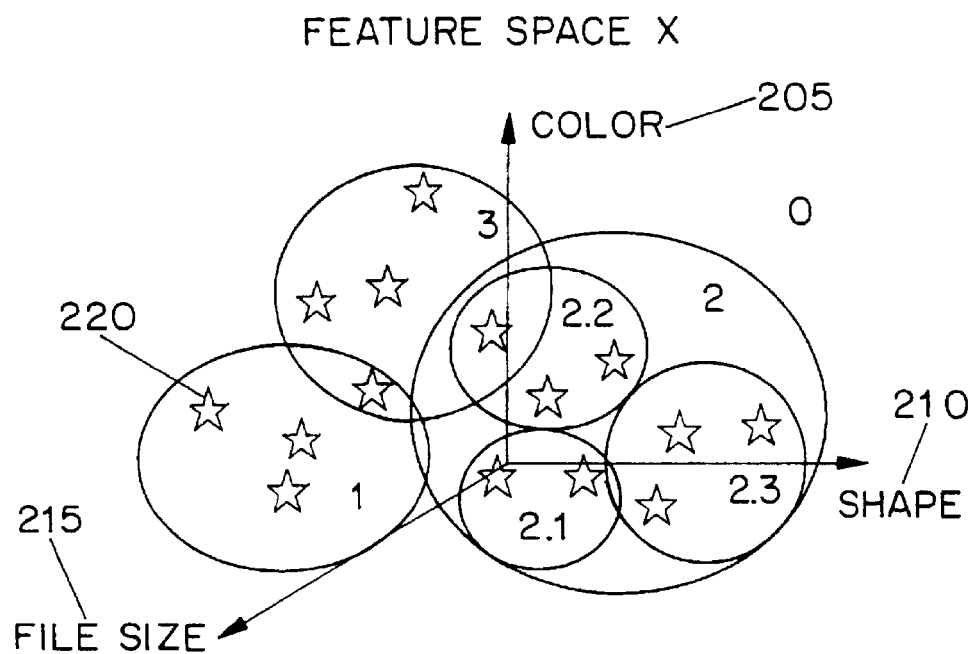
FIG. 2A is a Venn diagram illustrating exemplary multimedia archive content and potential clusters, in a feature space.
Figure 2B:
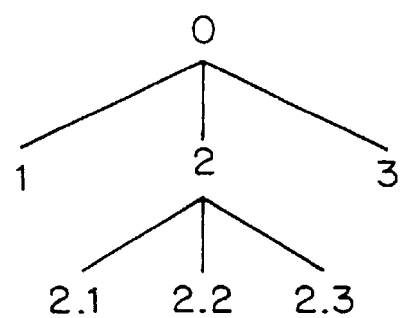
FIG. 2B is a hierarchal diagram illustrating an exemplary cluster decomposition relationship for the clusters identified in FIG. 2A.

Examples of the present multimedia archive description scheme, in accordance with FIG. 1, are illustrated in FIGS. 2 and 3. FIG. 2A graphically represents elements of an archive and possible clusters which are defined in a generic feature space, designated X. The elements 220 of this archive, which are illustrated as stars distributed in the feature space, can be still regions (e.g. image objects), moving regions (e.g. video objects), and video segments, among others. Clusters 0, 1, 2, 2. 1, 2.2, 2.3 and 3 are described in terms of attributes color 205, shape 210 and file size 215. FIG. 2B illustrates a simple decomposition relationship among the clusters in FIG. 2A. In this case, cluster 0 includes clusters 1, 2, and 3 and cluster 2 includes clusters 2.1, 2.2 and 2.3. Clearly, other relationships can be defined for these clusters, such as cluster 2 intersects cluster 2; cluster 2.2 has a higher average color value than cluster 2.1; etc.

Figure 3A:
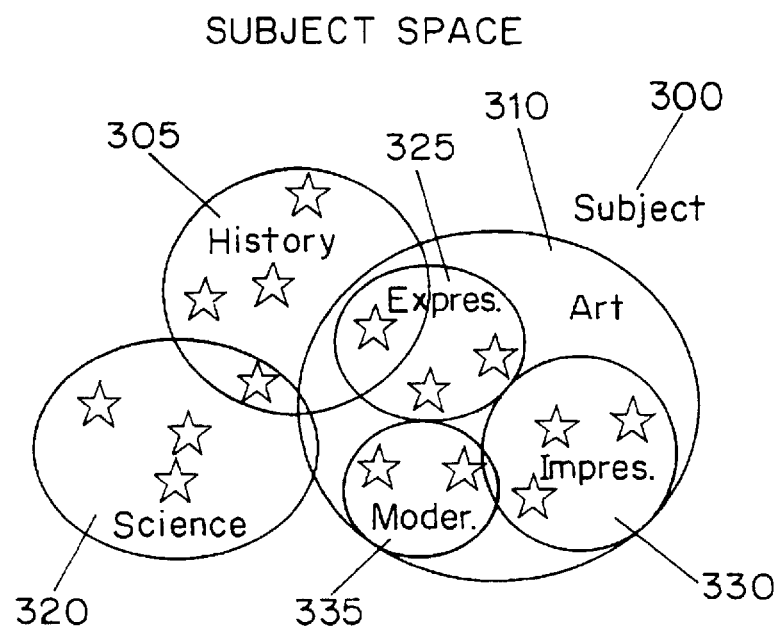
FIG. 3A is a Venn diagram illustrating exemplary multimedia archive content and potential clusters, in a subject space.
Figure 3B:
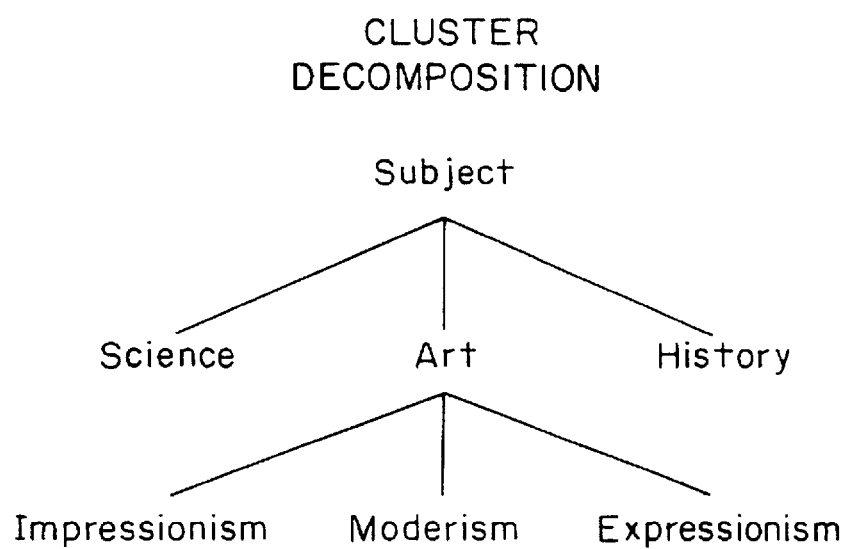
FIG. 3B is a hierarchal diagram illustrating an exemplary cluster decomposition relationship for the clusters identified in FIG. 3A.

FIGS. 3A and 3B also represent exemplary archive content defined as clusters, and a cluster decomposition relationship, respectively. Referring to FIG. 3A, the elements of this archive can be objects and events which are related by the exemplary clusters: Subject 300, History 305, Art 310 and Science 320. Within the Art cluster 310, the clusters Expressionist 325, Impressionist 330, and Modern 335 are defined. FIG. 3B illustrates a simple cluster decomposition relationship between the clusters of FIG. 3A.

Figure 4:
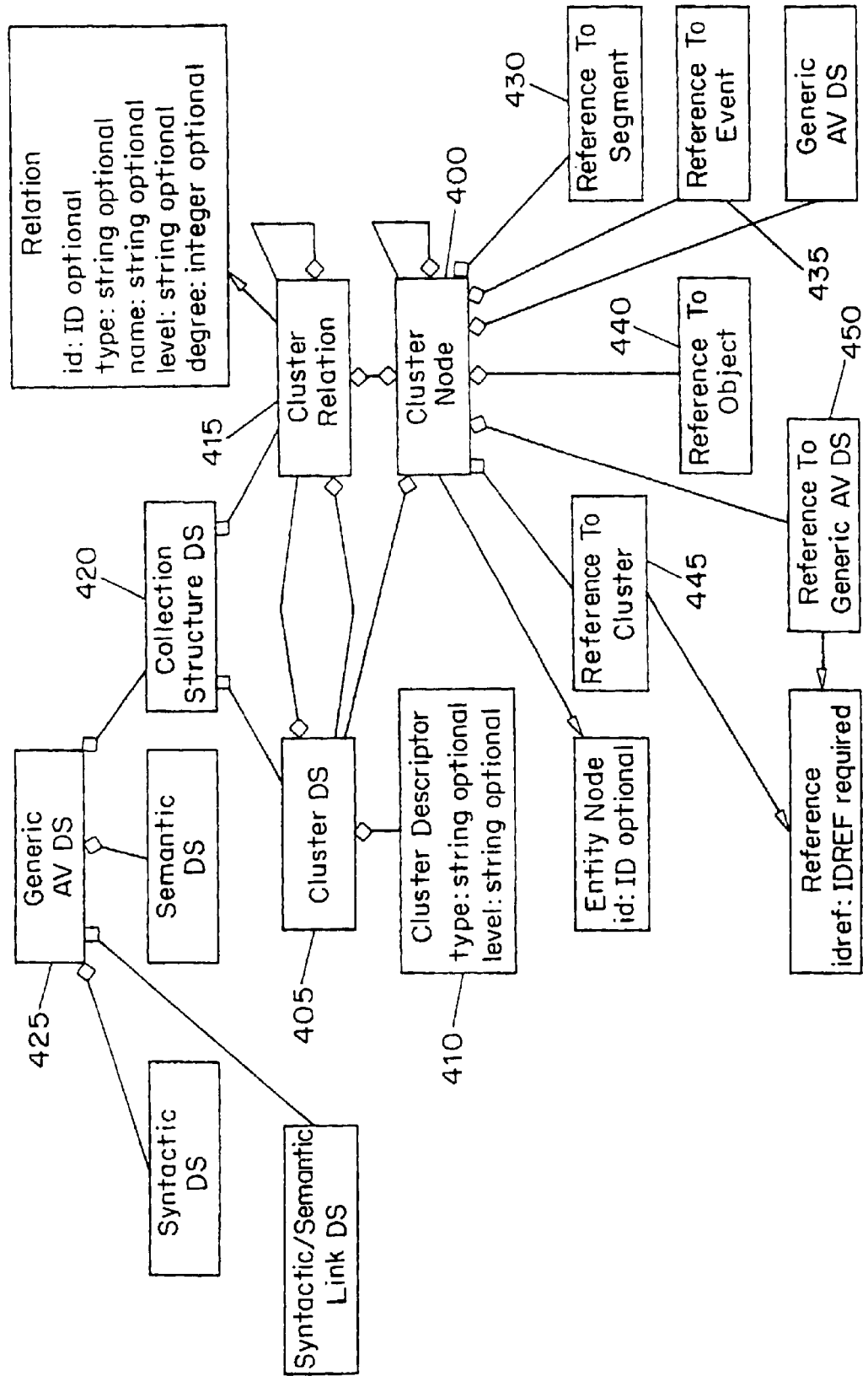
FIG. 4 is a block diagram illustrating a first embodiment of the present multimedia archive description scheme architecture.

FIG. 4 is a block diagram illustrating an embodiment of the present multimedia archive description scheme. This embodiment is one which extends the definition of a single record multimedia description scheme to represent multimedia archives having one or more records. In FIG. 4, the various blocks represent fields of information in the multimedia archive description scheme. The various blocks in the description scheme are linked by composition relationships, which are illustrated by diamond shaped arrows, or by inheritance relationships, which are illustrated by triangular shaped arrows. Clusters 100 are defined by at least one attribute 105 and may include one or more relationships 110. Referring to FIG. 4, these parameters are stored in a cluster description scheme block 405 which includes cluster relations 415 and cluster descriptors 410 by way of composition relationships. The cluster descriptor block 410 includes the attributes of the cluster. The cluster description scheme block 405 also includes a cluster node block 400. The cluster node block 400 is an element used for grouping a set of elements in a relationship. The cluster description scheme block 405 is also linked to a collection structure description scheme block 420, which is an index bridging the single document multimedia archive description scheme, such as a description scheme for generic Audio-Visual content (Generic AV DS) 425, to the cluster description scheme block 405 and cluster relations block 415.

The cluster node 400 includes references to various components which further describe the content of the individual records in the archive. For example, the cluster node 400 can include, via a composition link, references to segments 430 (such as video), references to events 435 and references to objects 440 (such as image objects) which are defined in an existing multimedia description scheme. The cluster node 400 can also include references to other clusters 445 and references to the multimedia description scheme 450. The references operate as pointers which convey the location of a source of information.

Figure 5:
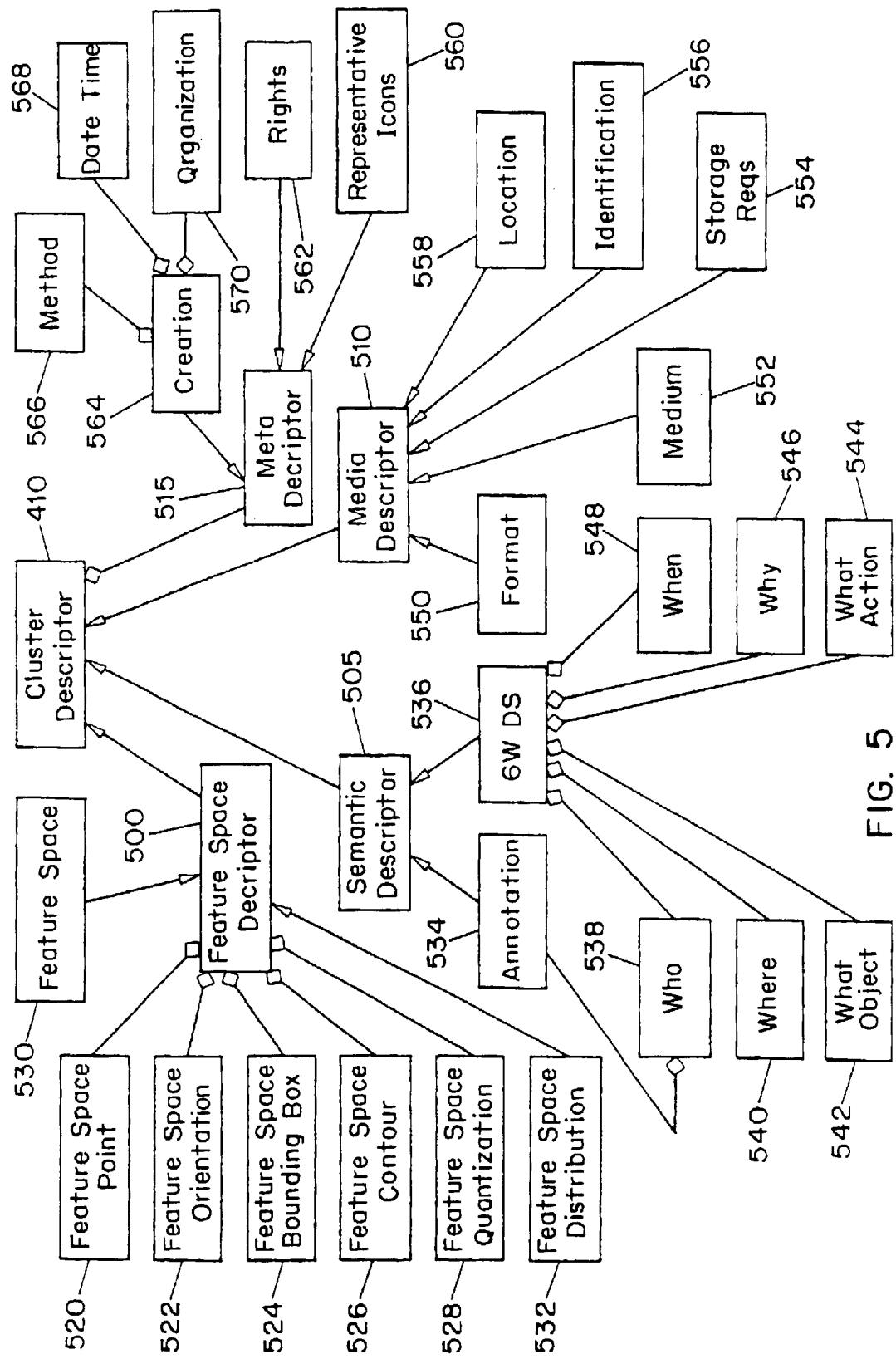
FIG. 5 is a block diagram illustrating an exemplary cluster descriptor arrangement, for use in connection with the description scheme architecture of FIG. 4.

The cluster descriptor block 410 is further defined in the relational block diagram of FIG. 5. The cluster descriptor block 410 can include feature space descriptors 500, semantic descriptors 505, media descriptors 510 and meta descriptors 515, which are used in connection with single document media description schemes.

The feature space descriptors are a set of properties which describe the feature space attributes of records in a description scheme. Such attributes are generally syntactic and refer to the way the content of records are arranged without considering the meaning conveyed by such arrangements. Feature space attributes generally describe the cluster by its appearance in a given feature space. Feature space attributes can also describe statistical attributes (e.g., size and higher order moments) of distribution of records in a cluster. Feature space attributes can include information such as feature space point 520, feature space orientation 522, feature space bounding box parameters 524, feature space contour definitions 526 and feature space quantization 528. The feature space descriptor 500 can also inherit the properties of the feature space 530 and feature space distribution 532.

The semantic descriptor block 505 can inherit free form annotations 534 as well as conventional 6-w parameters 536, which are also used in connection with the single record description schemes for multimedia records. Semantic attributes generally refer to the meaning conveyed by the arrangement of records. The 6-w's include who 538, where 540, what object 542, what action 544, why 546 and when 548.

The media descriptor block 510 includes information describing the media attributes of a cluster. For example, the media descriptor block 510 may inherit format information 550, storage requirements 552, file identification parameters 556, and file location information 558 of the clusters.

The meta descriptor block 515 includes author-generated information which is input by an author of the document or the creator of the cluster. The meta attributes of a cluster can include information related to the creation of the cluster, such as the method, constraints or rules followed to create the cluster based on the elements' attributes. As illustrated in FIG. 5, the meta descriptor block 515 can inherit information such as representative icons 560, intellectual property rights attribution 562 and creation information 564, such as method of creation 566, date/time of creation 568, and organization 570.

Figure 6:
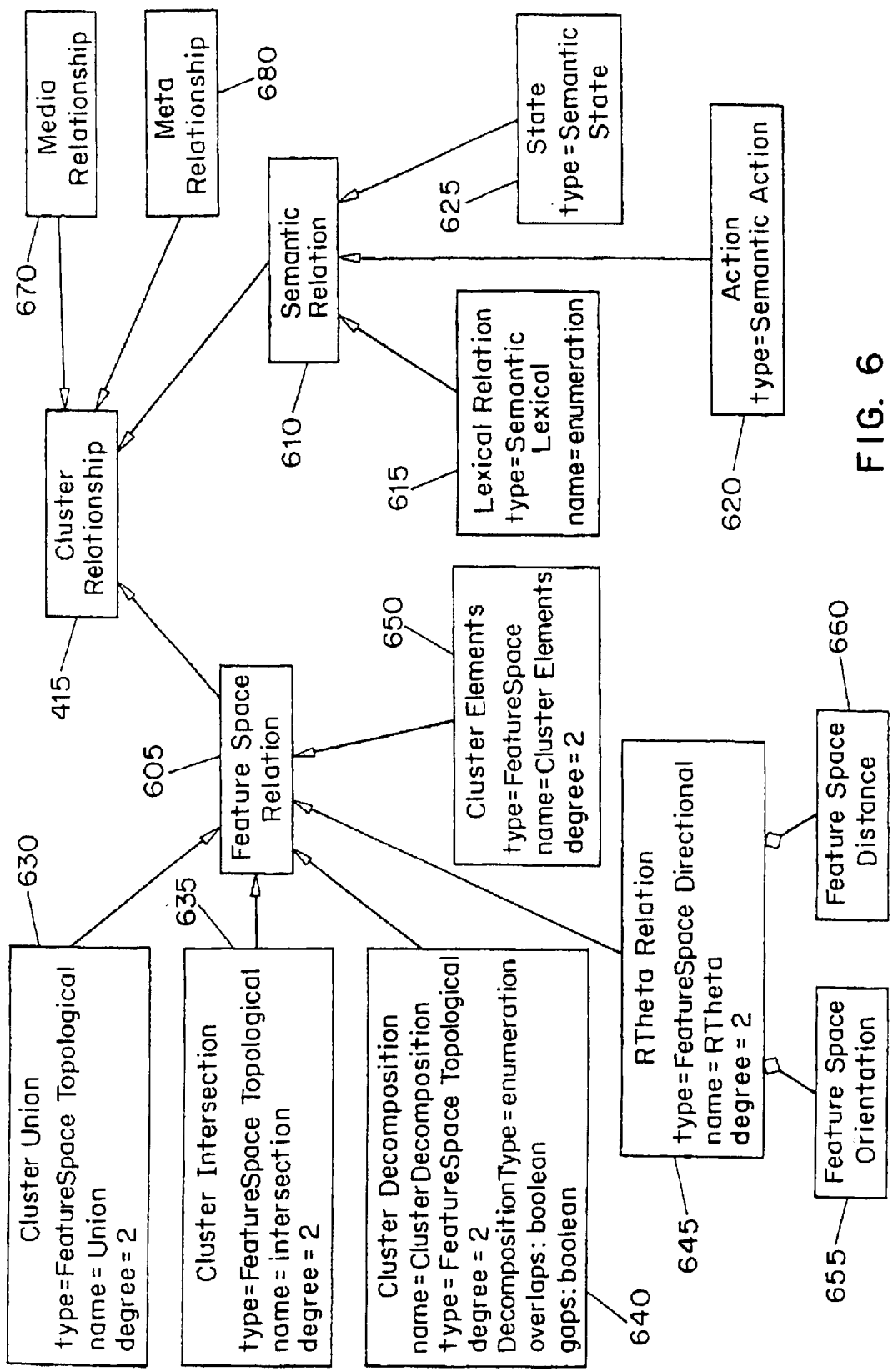
FIG. 6 is a block diagram illustrating an exemplary cluster relationship arrangement, for use in connection with the description scheme architecture of FIG. 4.

FIG. 6 further illustrates the construction and content of the cluster relationship block 415. Cluster relationships 415 can be broadly classified as feature space relationships 605, semantic relationships 610, media relationships 670 and meta relationships 680. Semantic relationships 610, which are used to relate semantic interpretations of clusters, further include lexical relationships 615, action relationships 620 and state relationships 625, all of which can be inherited from the description of the individual records in the archive collection. The action relationships 620 and state relationships 625 are examples of predictive relationships. For example, in FIG. 3, the relationship "Impressionism is a part of cluster Art" is a semantic relationship between the clusters "impressionism" and "art". The lexical relationships 615 correspond to the semantic relationships among nouns, such as those described in the article "WordNet: A lexical Database for English", by G. A. Miller, Communications of the ACM, Vol. 38, No. 11. pp. 39–41, November 1995. These relationships can include synonymy (e.g., "pipe is similar to tube"), antonymy (e.g., "happiness is opposite to sadness"), hyponymy/hypernymy (e.g., "a dog is an animal" and "an animal is the type of dog") and meronymy/holonymy (e.g., "a musician is member of a musical band" and "a musical band is composed of musicians"). Predicative semantic attributes can include action relationships 620 (e.g., "to throw" and "to hit") and state relationships 625 (e.g., "to own" and "to control") among two or more clusters. These relationships are further set forth in the table of FIG. 7, that provides an indexing structure for semantic relationships.

Feature space relationships 605 can include relationships such as cluster union 630, cluster intersection 635, cluster decomposition 640, Rtheta relationships 645 and cluster elements 650. These relationships are syntactic in nature. The Rtheta relationships generally include orientation information 655 and feature space distance information 660. This listing of feature space relationships is a non-exhaustive, representative list. The actual set of feature space relationships for a given archive description scheme instantiation can include subsets of these relationships and can also include other relationships not shown in FIG. 6, yet are relevant to a particular feature space. The table of FIG. 8 provides an exemplary indexing structure for syntactic relationships for the multimedia archive description scheme.

An exemplary embodiment of the multimedia archive description scheme illustrated in FIGS. 4–6 is set forth in Appendix A. This embodiment defines the present description scheme in XML (extensible mark-up language) syntax. Appendix B illustrates instantiations of the present archive description scheme set forth in Appendix A for the exemplary archives of FIGS. 2 and 3, respectively.

Figure 9:
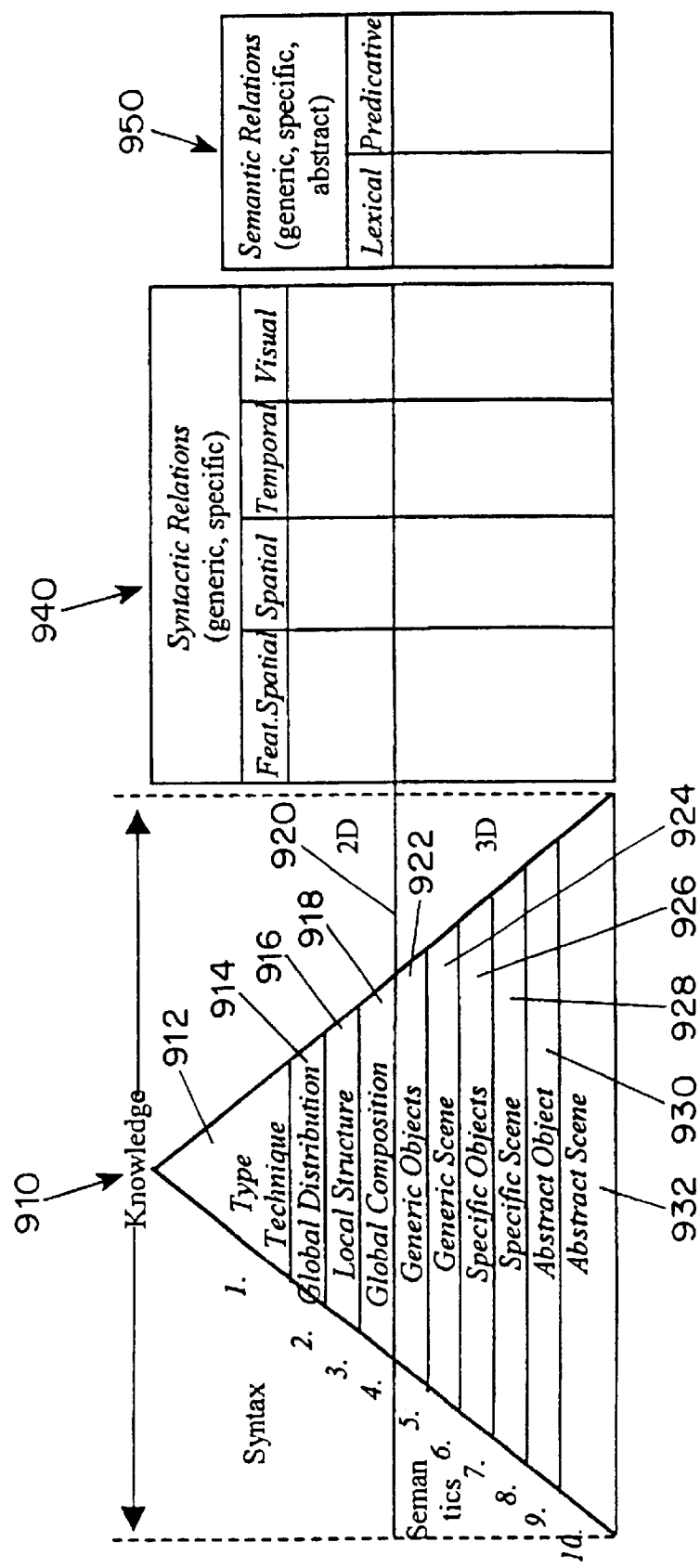
FIG. 9 is a pictorial representation of a cluster attribute index structure and cluster relationship index structure for an exemplary multimedia archive description scheme.

FIG. 9 is a pictorial diagram which provides a ten-level index structure for cluster attributes and a correspondence of this index structure to cluster relationships for an exemplary archive of records described by a generic audio-visual description scheme. In the exemplary generic audio-visual description scheme, records are generally images, image segments or video segments, and are described in terms of objects, regions and events. In FIG. 9, the cluster attribute index structure 910 is visually represented by a ten level pyramid representation. Each level in the index structure 910 represent attributes which require more information to define them than the layers above. As noted above, cluster attributes can be syntactic, semantic, media and meta type attributes. However, in the exemplary index structure 910 of FIG. 9, clusters are only characterized by syntactic and semantic attributes. In the exemplary index structure 910 syntactic attributes, such as type technique 912, global distribution 914, local structure 916 and global composition 918 make up the first four layers of the index structure 910. The lower six layers of the index structure describe semantic cluster attributes, such as generic objects 922, generic scene 924, specific objects 926, specific scene 928, abstract object 928 and abstract scene 932. The dividing line 920 between layers 918 and 922 graphically illustrates the transition from syntactic attributes to semantic attributes.

The type/technique level 912 provides general information about the visual characteristics of a cluster, which can include descriptions of the features used to create the cluster (e.g., color, texture, etc.), the types of elements in the cluster groups (e.g., objects, animated regions, etc.) and the like. The global distribution level 914 classifies clusters based on attributes of global content, which are generally measured in terms of low-level perceptual features of the records. Global distribution features can include global color characteristics (e.g., dominant color, average color, histogram, etc.), global texture (e.g., coarseness, directionality, contrast), global shape (e.g., aspect ratio), global motion parameters (e.g., speed, acceleration, direction), global deformation (e.g, expanding speed), temporal/spatial dimensions, feature space dimensions, and the like. The global distribution level 914 can also include statistical attributes of the cluster, such as size (the number of records in a cluster), and higher order moments of distribution of records in a cluster.

The local structure level 916 is for attributes related to the extraction and characterization of local components of the cluster. Local components generally exhibit elements (e.g., regions, objects) with a homogenous distribution in the given feature space. Local structure attributes include distribution masks, centroids, first and second moments, local distribution functions and the like.

The global composition level 918 is the last syntactic, or feature space, attribute level of the index structure 910. In this context, global composition refers to the arrangement or spatial layout of the clusters in the feature space. In the global composition level 918 includes attributes which relate to the specific arrangement or composition of the elements set forth in the local structure level 916. This can include concepts such as the number of sub-clusters, boundaries of the cluster, symmetry and the like.

The next level down in the index structure 910 (level of increasing knowledge) is the generic objects level 922, which is the first semantic attribute layer in the hierarchy. Generic objects are those which are described at a fundamental level using only commonly available knowledge. Generic objects can include such things as "person" and "sky". Such objects are defined in terms of generic object attributes in the generic object level 922.

Below the generic objects level 922 is the generic scenes level 924, which indexes clusters both on the generic objects and their arrangement. Generic scene classes can include city, landscape, indoor, outdoor, still life, portrait and the like. As with generic objects, only generally available knowledge is required to classify records as generic scenes.

Unlike generic objects, specific objects refer to those objects which are identified and grouped using specific information. For example "George Washington" is a specific-object attribute. Specific object attributes are indexed in the specific object level 926 of the index structure 910. Similarly, the specific scene level 928 is analogous to the generic scene level 924 except that the attributes are further defined in terms of specific knowledge related to the records. "New York City" is an example of a specific scene attribute.

Moving down the index structure 910 more knowledge is required. Beneath the specific scene level 928 is the abstract object level 930. Abstract objects are defined in terms of very specialized knowledge which is highly subjective in nature. Abstract objects can include emotions, such as "anger" or "happy," as well as concepts such as "hardworking," "decisive" and the like. Similarly, for the abstract scene level 932, attributes which refer to what the cluster as a whole represents are referenced. Thus the semantic object "New York City" could be described by abstract-scene attributes such as "fun," "hip," "chaotic" and the like. As such attributes require the most specialized knowledge of what the cluster is and represents, the abstract scene level 932 forms the base of the index hierarchy.

Cluster relationships can be defined at the different levels of the attribute index structure 910. Syntactic relationships can be defined at the syntactic and semantic levels. This is represented by the syntactic relationship table 940 extending above and below the dividing line 920 in the index structure 910. Semantic relationships 950 can only be defined in terms of semantic levels. Thus the table of semantic relationships 950 is shown only extending below the dividing line 920.

As set forth in FIGS. 7–9, from the ten-level index structure 910 of FIG. 9, relationships can be defined at different levels. Semantic relationships can be defined at the levels generic, specific and abstract. For example, "to own stock" is a generic semantic (action) relationship; "to own 80% of the stock" is a specific semantic (action) relationship; and "to control the company" is an abstract semantic relationship. Syntactic relationships, such as illustrated in FIG. 8, can only be formed on the generic level ( e.g., "similar distribution") or the specific level ("e.g., the difference in the variance is x) of the in the index structure 910. Referring to FIG. 8, syntactic relationships include feature spatial relationships such as topological and directional relationships. The topological relationships can further be defined on the generic level (e.g., near from, far from, adjacent to, etc.) and on the specific level (e.g., the union of, the intersection of, distance of centroids, etc.). Similarly, directional relationships can be defined on the generic level (e.g., to the direction of increasing feature A, to the direction of decreasing feature B) and the specific level (e.g., angle between centroids of clusters in feature space x).

Figure 10:
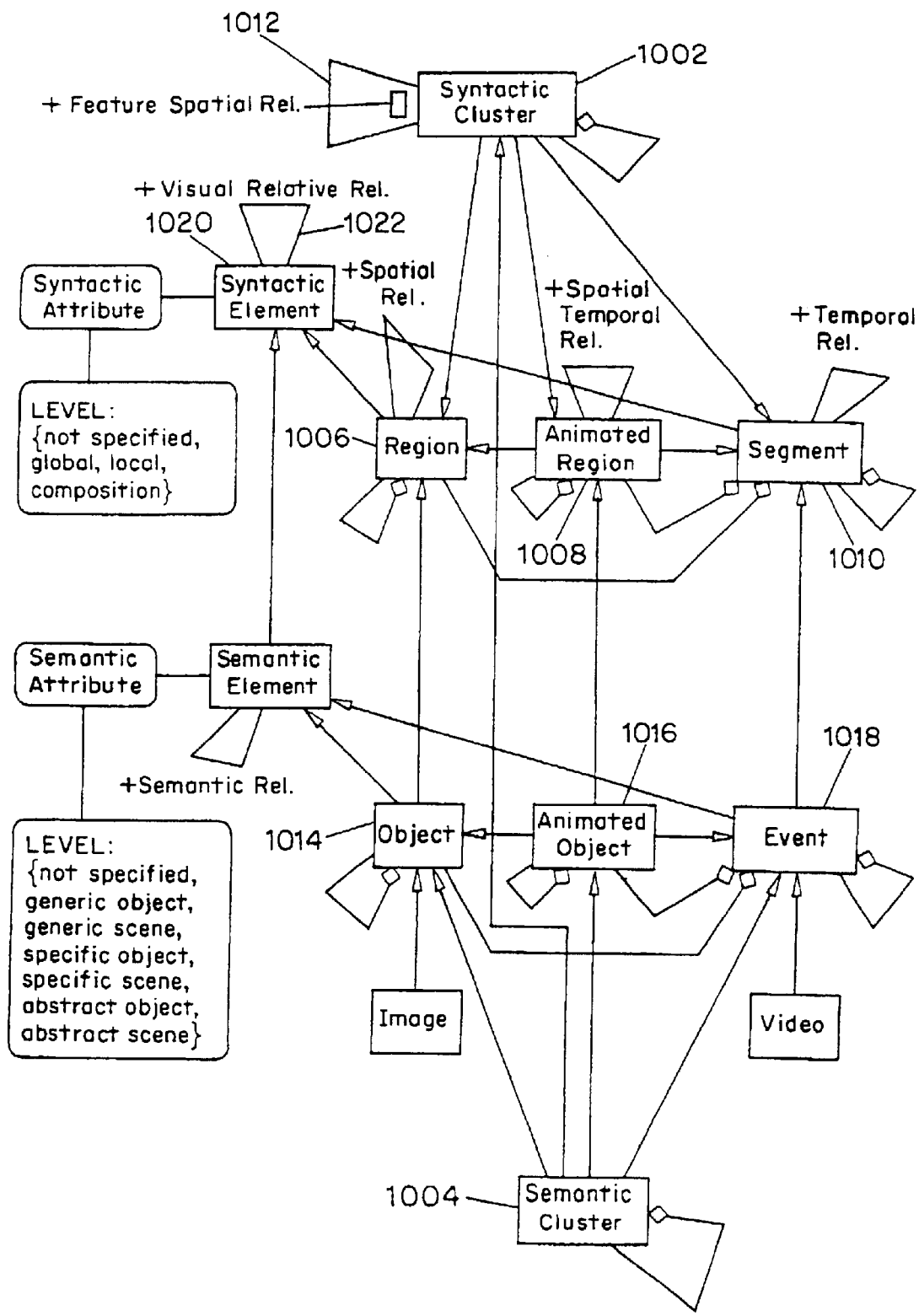
FIG. 10 is a block diagram illustrating an exemplary entity-relationship model for a multimedia archive description scheme.

FIG. 10 is a relational flow diagram that illustrates an entity-relationship model for an archive description scheme for generic audio-visual description scheme, as discussed in connection with FIG. 9. In this exemplary entity relationship model, clusters are classified in accordance with their attributes and relationships, as syntactic clusters 1002 and semantic clusters 1004. Clusters can also be defined as media clusters and meta clusters, which are not shown in FIG. 10. In the case of an archive for a visual description scheme, the syntactic clusters can be derived from regions 1006, animated regions 008 and segments 1010 which can be specific record types defined in the visual description scheme. The syntactic cluster 1002 can also include the syntactic relationships 1012, as illustrated in FIG. 8. The semantic cluster 1004 is derived from objects 1014, animated objects 1106, events 1018 and syntactic clusters 1002, by inheritance relationships. The entity-relationship model also includes syntactic elements 1020 which are derived from the regions 1006, animated regions 1008, segments 1010 as well as visual feature relationships 1022. The syntactic elements 1020 are defined in terms of syntactic attributes 1024. Similarly, semantic elements 1026 are derived from objects 1014, animated objects 1016, events 1018 and semantic relationships 1028. The semantic elements are defined by semantic attributes 1030.

Figure 11:
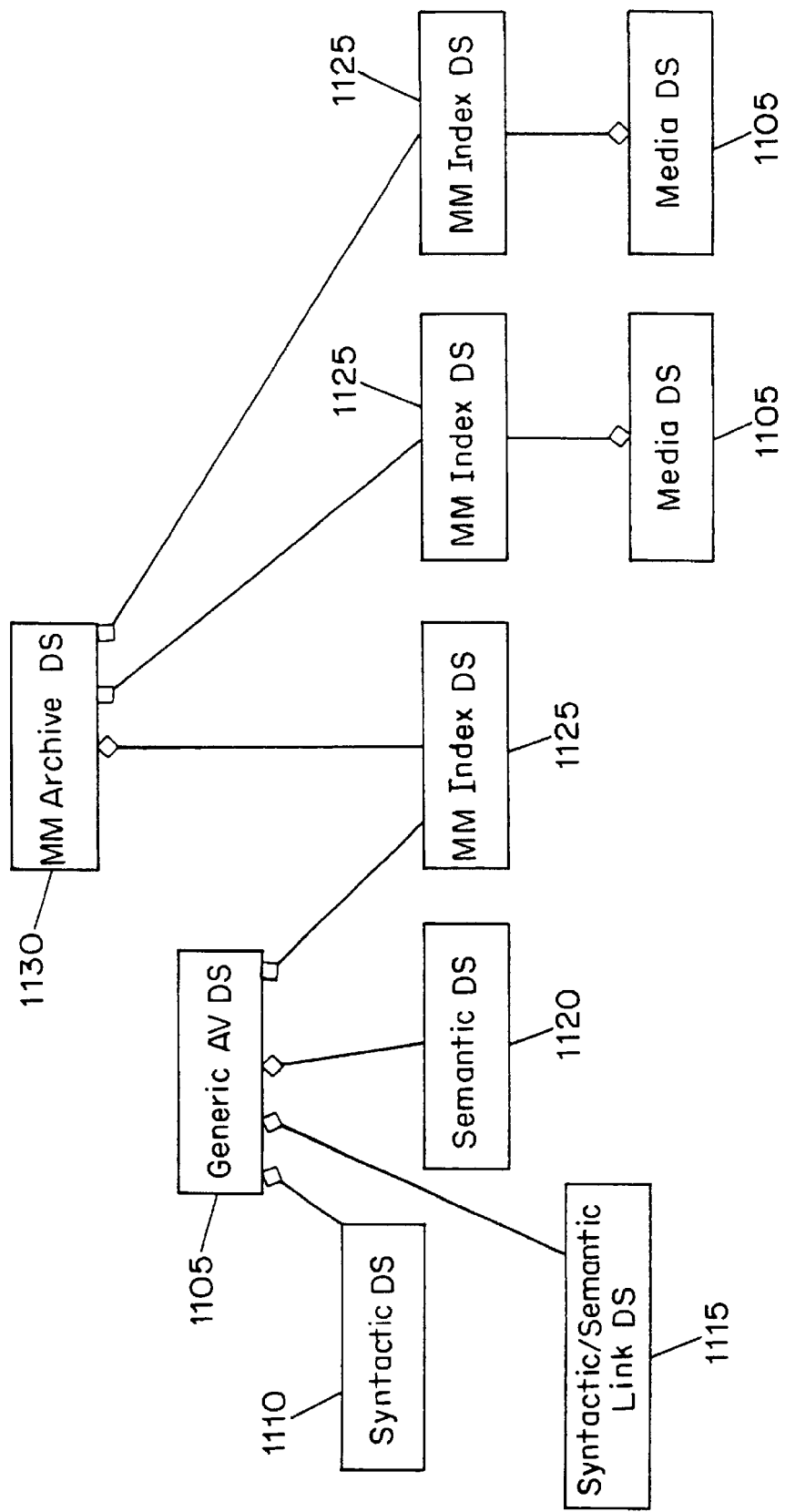
FIG. 11 is a block diagram illustrating an alternate embodiment of the present multimedia archive description scheme architecture.

The embodiment of FIG. 4 illustrates an extension of a single record multimedia description scheme for use as a multimedia archive description scheme. This embodiment is appropriate if the basic single record description scheme(s) can readily be modified. FIG. 11 is a block diagram of an alternate embodiment of a multimedia archive description scheme which is suitable for use in conjunction with a non-modified single record description scheme.

Referring to FIG. 11, the single record description scheme is represented by an Audio-Video description scheme (AV DS) block 1105, which can include a syntactic description scheme 1110, a syntactic/semantic link description scheme 1115 and a semantic description scheme 1120. A multimedia index description scheme 1125 provides an index reference to the single document description scheme 1105 for a multimedia archive description scheme block 1130. The multimedia archive description scheme block 1130 can include a number of multimedia index description scheme blocks 1125, each of which relate to a corresponding single document description schemes 1105. Thus, rather than altering and expanding a single document description scheme to be suitable for multiple record description, the multimedia archive description scheme block 1130 references standard single document description schemes via multiple multimedia index description scheme blocks 1125, which essentially provide an index of the individual records for the multimedia archive description scheme block 1130.

Figure 12:
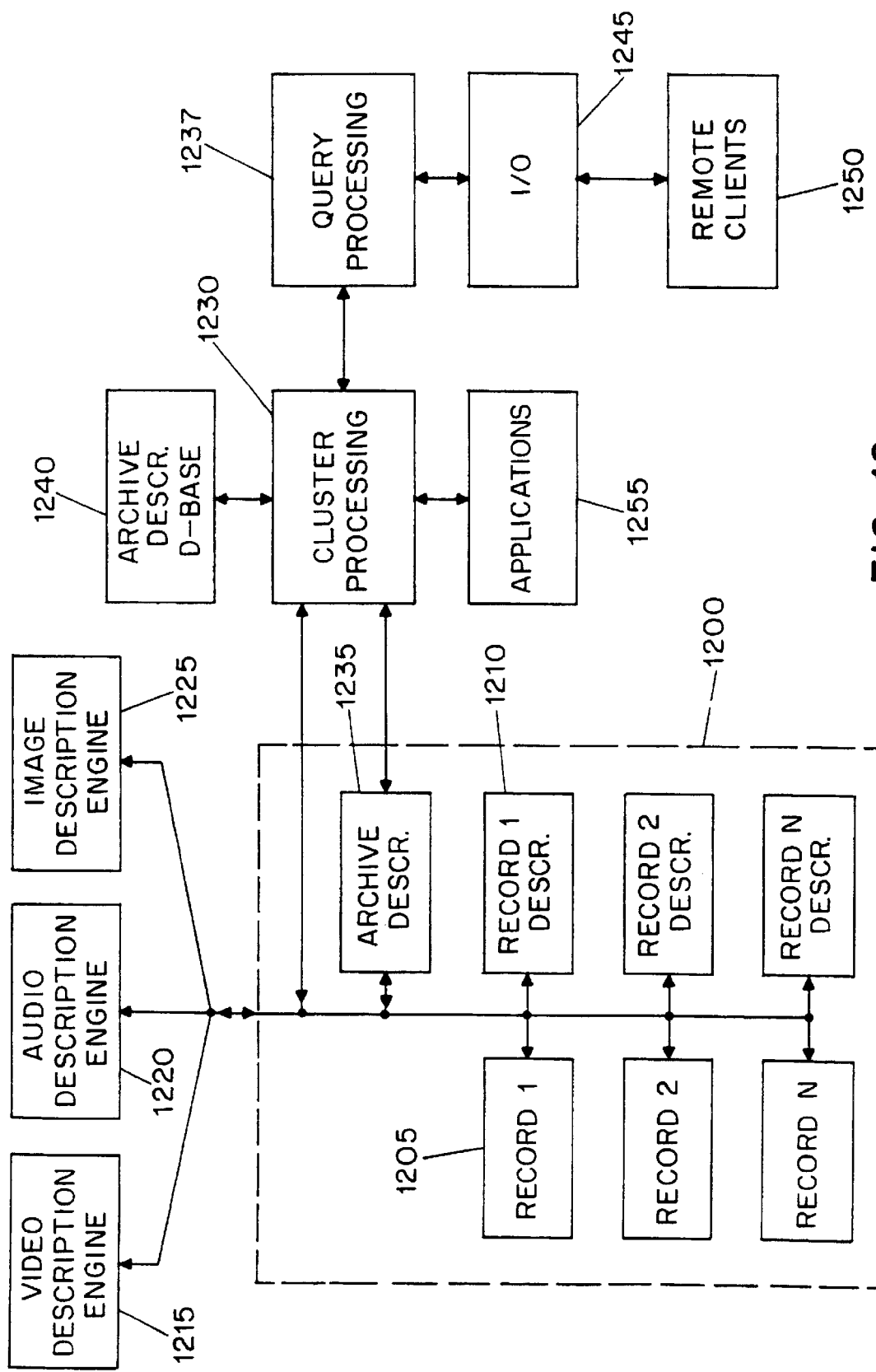
FIG. 12 is a block diagram of a multimedia archive system employing a multimedia archive description scheme in accordance with the present invention.

FIG. 12 is a block diagram of a multimedia archive system in accordance with the present multimedia archive description scheme, systems and methods. The system includes archive storage 1200 wherein multimedia records 1205 and associated multimedia record descriptions 1210 are stored in computer readable media, such as optical disk storage, magnetic disk storage and the like. The multimedia records 1205 can take the form of digital images, image segments, digitized video segments, Internet web pages, hyper-text based documents (HTML, XML and the like), digital audio files and the like. The record descriptions 1210 correspond to the records and provide descriptions in accordance with a description scheme defined for the particular record type. While the archive storage will generally reside locally in storage on a host computer, the archive storage can be remotely located, such as through a collection of hyper-text links, or pointers, which reference remote locations for the records 1205 and descriptions 1210.

The multimedia archive system can also include various description engines which characterize individual multimedia records in accordance with an appropriate description scheme. For example, the system of FIG. 12 includes a video description engine 1215, an audio description engine 1220 and an image description engine 1225. The description engines can access the records 1205 in the archive storage 1200 and generate the record descriptions 1210 in accordance with appropriate record description schemes for individual records.

The multimedia archive system includes a cluster processing subsystem 1230. The cluster processing subsystem accesses the record descriptions 1210 and generates clusters, as described in connection with FIGS. 1 and 4–6. In addition, clusters can be defined manually by a user or semi-automatically by a combination of user input and cluster processing subsystem 1230 operations. The cluster processing subsystem 1230 generates a multimedia archive description 1235, including the cluster definitions and multimedia index or collection structure, in accordance with the description scheme defined in accordance with FIGS. 4–7. The multimedia archive description 1235 can reside in the archive storage 1200. Alternatively, the multimedia archive description can be stored in an archive description database 1240, which is also accessible by the cluster processing subsystem 1230.

The system of FIG. 12 also includes a query processing subsystem 1237. The query processing subsystem 1237 can access the archive description 1235 via the cluster processing subsystem 1230. Alternatively, the query processing subsystem 1235 can directly access the archive description in the archive storage 1200 or archive description database 1240. The query processing subsystem 1237 can receive a user query through applicable input/output (I/O) circuitry 1245, which can include communication ports, search engines, keyboards, digitizers and the like (not shown). The archive system can be accessed by remote client computer systems 1250 via a dedicated physical I/O connection, such as a dedicated terminal, or via a network connection, such as the Internet. Various media based applications tools and software 1255 can also be used in connection with the present archive description scheme and system. Such applications can work in conjunction with the cluster processing subsystem 1230 and I/O circuitry 1245 to effect various functionality.

The various processing systems and subsystems of FIG. 12 can be implemented on a dedicated computer such as a mainframe computer or a single personal computer. Alternatively, the various subsystems can be implemented using a number of computer stations which are interconnected via a network, such as a local area network or the Internet.

The present multimedia archive description scheme provides data structures that describe collections of multimedia documents. The data structure of the present multimedia archive description scheme are based on clusters, which are description units that interrelate the records in the collection by one or more similarity measures based on attributes and relationships. The present description schemes can be realized as an extension of an existing single document description scheme or as a data structure which works in concert with unmodified description schemes via multiple multimedia index descriptions.

Although the present invention has been described in connection with specific exemplary embodiments, it should be understood that various changes, substitutions and alterations can be made to the disclosed embodiments without departing from the spirit and scope of the invention as set forth in the appended claims.

---

Annex A: MPEG-7 DDL Representation of the Archive DS

```
<DSType name="GenericAVDS">
    <attrDecl name="id"><datatypeRef name="ID"/></attrDecl>
    <attrDecl name="href"><datatypeRefname="uri"/></attrDecl>
    <DSTypeRef name="SyntacticDS" minOccur="0" maxOccur="1"/>
    <DSTypeRef name="SemanticDS" minOccur="0" maxOccur="1"/>
    <DSTypeRef name="SyntacticSemanticLinkDS" minOccur="0" maxOccur="1"/>
    <DSTypeRef name="ModelDS" minOccur="0" maxOccur="1"/>
    <DSTypeRef name="MetaDS" minOccur="0" maxOccur="1"/>
    <DSTypeRef name="MediaDS" minOccur="0" maxOccur="1"/>
    <DSTypeRef name="SummaryDS" minOccur="0" maxOccur="1"/>
    <DSTypeRef name="MMIndexDS" minOccur="0" maxOccur="1"/>
</DSType>
<DSType name="MMIndexDS">
    <DSTypeRef="ClusterDS" minOccur="0" maxOccur="*"/>
    <DSTypeRef="ClusterRelation" minOccur="0" maxOccur="*"/>
</DSType>
<DSType name="ClusterDS">
    <DescTypeRef="ClusterDescriptor" minOccur="0" maxOccur"*"/>
    <DSTypeRef="ClusterRelation" minOccur="0" maxOccur"*"/>
</DSType>
<DSType name="ClusterRelation">
    <subDSOf name="Relation"/>
    <choice minOccur="1" maxOccur="*">
```

-continued

Annex A: MPEG-7 DDL Representation of the Archive DS

```
            <DSTypeRef="Cluster"/>
            <DSTypeRef="ClusterNode"/>
            <DSTypeRef="ClusterRelation"/>
        </choice>
</DSType>
<DSType name="ClusterNode">
    <subDSOf name="EntityNode"/>
    <choice minOccur="0" maxOccur="*">
        <DescTypeRef name="ReferenceToSegment">
        <DescTypeRef name="ReferenceToObject"/>
        <DescTypeRef name="ReferenceToEvent"/>
        <DescTypeRef name="ReferenceToCluster"/>
        <DSTypeRef name="Cluster"/>
        <DSTypeRef name="ClusterNode"/>
    </choice>
    <DSTypeRef name="ClusterRelation" minOccur="0" maxOccur=
"*"/>
</DSType>
<DescType name="ClusterDescriptor>
    <attrDecl name="type"><datatypeRef name="string"/><attrDecl>
    <attrDecl name="level"><datatypeRef name="string"/></attrDecl>
</DescType>
<!-- Specialized cluster descriptors -->
<DescType name="FeatureSpaceDescriptor">
    <subDescOf name="ClusterDescriptor"/>
</DescType>
<DescType name="FeatureSpace" minOccur="0" maxOccur="1">
    <subDescOf name="FeatureSpaceDescriptor"/>
    <attrDecl name="NumberDimensions"><datatypeRef name=
"integer"/></attrDecl>
    <DescType name="FeatureDimension" minOccur="1" maxOccur=
"*">
        <attrDecl name="name"><datatypeRef name=
"string"/></attrDecl>
        <attrDecl name="id"><datatypeRef name="ID"/></attrDecl>
    </DescType>
</DescTypeRef>
<DescType name="FeatureSpacePoint" minOccur="1" maxOccur="*">
    <subDescOf name="FeatureSpaceDescriptor"/>
    <attrDecl name="unit"><datatypeRef name="double"/></attrDecl>
    <DescType name="DimensionOrdinate" minOccur="1" maxOccur=
"*">
        <attrDecl name="dimension"><datatypeRef name=
"IDREF"/></attrDecl>
        <datatypeRef name="double"/>
    </DescType>
</DescType>
<DescType name="FeatureSpaceOrientation" minOccur="1" maxOccur=
"1">
    <subDescOf name="FeatureSpaceDescriptor"/>
    <attrDecl name="unit"><datatypeRef name="double"/></attrDecl>
    <DescType name="DimensionAngle" minOccur="1" maxOccur=
"*">
        <attrDecl name="dimension" required="true">
            <datatypeRef name="IDREF"/>
        </attrDecl>
        <datatypeRef name="double"/>
    </DescType>
</DescType>
<DescType name="FeatureSpaceBoundingBox">
    <subDescOf name="FeatureSpaceDescriptor"/>
    <DescTypeRef name="FeatureSpace" minOccur="0" maxOccur=
"1"/>
    <choice minOccur="1" maxOccur="1">
        <all>
            <DescType name="FeatureSpaceCenter"
            minOccur="1" maxOccur="1">
                <subDescOf name="FeatureSpacePoint/>
            </DescType>
            <DescTypeRef name="FeatureSpaceOrientation"
            minOccur="1"
maxOccur="1"/>
        </all>
        <all>
            <DescTypeRef name="FeatureSpacePoint" minOccur="1"
```

-continued

Annex A: MPEG-7 DDL Representation of the Archive DS

```
maxOccur="*"/>
        </all>
    </choice>
</DescType>
<DescType name="FeatureSpaceContour">
    <subDescOf name="FeatureSpaceDescriptor"/>
    <DescTypeRef name="FeatureSpace" minOccur="0" maxOccur=
"1"/>
    <DescTypeRef name="FeatureSpacePoint" minOccur="1"
maxOccur="*"/>
</DescType>
<DescType name="FeatureSpaceQuantization">
    <subDescOf name="FeatureSpaceDescriptor"/>
    <choice minOccur="1"maxOccur="1">
        <DescTypeRef name="LinearQuantization" minOccur="1"
        maxOccur="1"/>
        <DescTypeRef name="NonLinearQuantization" minOccur="1"
        maxOccur="1"/>
        <DescTypeRef name="LookupTable" minOccur="1"
        maxOccur="1"/>
    </choice>
</DescType>
<DescType name="FeatureSpaceDistribution">
    <subDescOf name="FeatureSpaceDescriptor"/>
    <attrDecl name="NumberOfBins"><datatypeRef name=
"integer"/></attrDecl>
    <choice m inOccur="1" maxOccur="1">
        <DescType name="Distribution" minOccur="1"
        maxOccur="1">
            <subDescOf name="FeatureSpaceDescriptor"/>
            <attrDecl name="name"><datatypeRef name=
"string"/></attrDecl>
            <DescType name="Moment">
                <attrDecl name="oder"><datatypeRef name=
"integer"/>
                </attrDecl>
                <datatypeRef name="double"/>
            </DescType>
        </DescType>
        <DescType name="DistributionFunction" minOccur="1"
        maxOccur="1">
            <subDescOf name="FeatureSpaceDescriptor"/>
            <DescTypeRef name="FeatureSpace" minOccur="0"
            maxOccur="1"/>
            <DescTypeRef name="FeatureSpaceQuantization"
            minOccur="0"
maxOccur="1"/>
            <DescTypeRef name="DistributionFunctionValues"/>
        </DescType>
    </choice>
</DescTypeRef>
</DescType>
<DescType name="FeatureSpaceElementTypes">
    <subDescOfname="FeatureSpaceDescriptor"/>
    <DescType name="ElementType" minOccur="1" maxOccur="*">
        <attrDecl name="name"><datatypeRef name=
"string"/></attrDecl>
        <DescType name="Percentage">
            <datatypeRef name="percentage"/>
        </DescType>
    </DescType>
</DescTypeRef>
<DescType name="SemanticDescriptor">
    <subDescOf name="ClusterDescriptor"/>
</DescType>
<DescType name="Annotation">
    <subDescOf name="SemanticDescriptor"/>
    <datatypeRef name="string"/>
</DescType>
<DescType name="6-WDS">
    <subDescOf name="SemanticDescriptor"/>
    <DescTypeRef name="Who" minOccur="0" maxOccur="1"/>
    <DescTypeRef name="WhatObject" minOccur="0"
    maxOccur="1"/>
    <DescTypeRef name="WhatAction" minOccur="0"
    maxOccur="1"/>
```

Annex A: MPEG-7 DDL Representation of the Archive DS

```
        <DescTypeRef name="When" minOccur="0"
        maxOccur="1"/>
        <DescTypeRef name="Where" minOccur="0"
        maxOccur="1"/>
        <DescTypeRef name="When" minOccur="0"
        maxOccur="1"/>
        <DescTypeRef name="Why" minOccur="0"
        maxOccur="1"/>
    <DescType>
    <DescType name="Who">
        <subDescOf name="SemanticDescriptor"/>
        <DescTypeRef name="Annotation" minOccur="1" maxOccur="*"/>
    <DescType>
    <DescType name="WhatObject">
        <subDescOf name="SemanticDescriptor"/>
        <DescTypeRef name="Annotation" minOccur="1" maxOccur="*"/>
    <DescType>
    <DescType name="WhatAction">
        <subDescOf name="SemanticDescriptor"/>
        <DescTypeRef name="Annotation" minOccur="1" maxOccur="*"/>
    <DescType>
    <DescType name="When">
        <subDescOf name="SemanticDescriptor"/>
        <DescTypeRef name="Annotation" minOccur="1" maxOccur="*"/>
    <DescType>
    <DescType name="Where">
        <subDescOf name="SemanticDescriptor"/>
        <DescTypeRef name="Annotation" minOccur="1" maxOccur="*"/>
    </DescType>
    <DescType name="Why">
        <subDescOf name="SemanticDescriptor"/>
        <DescTypeRef name="Annotation" minOccur="1" maxOccur="*"/>
    <DescType>
    <DescType name="MediaDescriptor">
        <subDescOf name="ClusterDescriptor"/>
    </DescType>
    <DescType name="Location">
        <subDescOf name="MediaDescriptor"/>
        <attrDecl name="href"><datatypeRef name="uri"/></attrDecl>
    </DescType>
    <DescType name="Identification">
        <subDescOf name="MediaDescriptor"/>
        <datatypeRef name="string"/><!-- or lexical expression -->
    </DescType>
    <DescType name="StorageRequirements">
        <subDescOf name="MediaDescriptor"/>
        <datatypeRef name="string"/>
    </DescType>
    <DescType name="Format">
        <subDescOf name="MediaDescriptor"/>
        <datatypeRef name="string"/>
    </DescType>
    <DescType name="Medium">
        <subDescOf name="MediaDescriptor"/>
        <datatypeRef name="string"/>
    </DescType>
    <DescType name="MetaDescriptor">
        <subDescOf name="ClusterDescriptor"/>
    </DescType>
    <DescType name="Creation">
        <subDescOf name="MediaDescriptor"/>
        <DescType name="Method" minOccur="0" maxOccur="1">
            <attrDecl name="mode">
                <enumeration>
                    <literal>Automatic</literal>
                    <literal>Manual</literal>
                </enumeration>
            <DescTypeRef name="Rules"/>
            <DescTypeRef name="RepresentativeExamples"/>
            <DescTypeRef name="Classifier"/>
                <DescTypeRef name="ManualClassification"/>
        </DescType>
        <DescType name="DateTime"><datatypeRef name=
        "dateTime"/></DescType>
        <DescType name="Organization"><datatypeRef name=
        "string"/></DescType>
</DescType>
<DescType name="Rights">
    <subDescOf name="MetaDescriptor"/>
    <datatypeRef name="string"/>
</DescType>
<DescType name="RepresentativeIcons">
    <subDescOf name="MetaDescriptor"/>
    <DescTypeRef name="Location" minOccur="1" maxOccur="*"/>
</DescType>
<!-- Specialized cluster relationships -->
<DSType name="FeatureSpaceRelation">
    <subDSOf name="ClusterRelation"/>
</DSType>
<DSType name="ClusterDecomposition">
    <subDSOfname="FeatureSpaceRelation"/>
    <attrDecl name="type"><fixed>FeatureSpace
    Topological</fixed></attrDecl>
    <attrDecl name="name"><fixed>ClusterDecomposition</fixed>
    </attrDecl>
    <attrDecl name="degree"><fixed>2<fixed></attrDecl>
    <attrDecl name="DecompositionType">
        <enumeration>
            <literal>Temporal</literal>
            <literal>Spatial</literal>
            <literal>Spatial Temporal</literal>
            <literal>Media<literal>
            <literal>FeatureSpace</literal>
        </enumeration>
    </attrDecl>
    <attrDecl name="overlaps"><datatypeRef name="boolean"/>
    </attrDecl>
    <attrDecl name="gaps"><datatypeRef name="boolean"/><attrDecl>
</DSType>
<DSType name="ClusterUnion">
    <subDSOfname="FeatureSpaceRelation"/>
    <attrDecl name="type"><fixed>FeatureSpace
    Topological</fixed></attrDecl>
    <attrDecl name="name"><fixed>Union</fixed></attrDecl>
    <attrDecl name="degree"><fixed>2</fixed></attrDecl>
</DSType>
<DSType name="ClusterIntersection">
        <subDSOf name="FeatureSpaceRelation"/>
        <attrDecl name="type"><fixed>FeatureSpace
        Topological</fixed></attrDecl>
    <attrDecl name="name"><fixed>Intersection</fixed></attrDecl>
    <attrDecl name="degree"><fixed>2</fixed></attrDecl>
</DSType>
<DSType name="ClusterNegation">
    <subDSOf name="FeatureSpaceRelation"/>
    <attrDecl name="type"><fixed>FeatureSpace
    Topological</fixed></attrDecl>
    <attrDecl name="name"><fixed>Negation</fixed></attrDecl>
    <attrDecl name="degree"><fixed>1</fixed></attrDecl>
</DSType>
<DSType name="ClusterElements">
    <subDSOf name="FeatureSpaceRelation"/>
    <attrDecl name="type"><fixed>FeatureSpace</fixed></attrDecl>
    <attrDecl name="name"><fixed>Elements</fixed></attrDecl>
    <attrDecl name="degree"><fixed>2</fixed></attrDecl>
</DSType>
<DSType name="RThetaRelation">
    <subDSOf name="FeatureSpaceRelation"/>
    <attrDecl name="type"><fixed>FeatureSpace
    Directional</fixed></attrDecl>
    <attrDecl name="name"><fixed>Elements</fixed><attrDecl>
    <attrDecl name="degree"><fixed>2</fixed></attrDecl>
    <DescTypeRef name="FeatureSpaceOrientation" minOccur="1"
    maxOccur="1"/>
    <DescType name="FeatureSpaceDistance" minOccur="1"
    maxOccur="1">
        <datatypeRef name="double"/>
    </DescType>
</DSType>
<DSType name="SemanticRelation">
    <subDSOf name="ClusterRelation"/>
</DSType>
<DSType name="LexicalRelation">
```

Annex A: MPEG-7 DDL Representation of the Archive DS

```
<subDSOf name="SemanticRelation"/>
<attrDecl name="type">
    <enumeration>
        <literal>Synonymy</literal>
        <literal>Antonymy</literal>
        <literal>Hyponymy</literal>
        <literal>Meronymy</literal>
    </enumeration>
</attrDecl>
<attrDecl name="degree"><fixed>2</fixed></attrDecl>
</DSType>
<DSType name="ActionRelation">
    <subDSOf name="SemanticRelation"/>
    <attrDecl name="type"><fixed>Semantic Action</fixed></attrDecl>
</DSType>
<DSType name="StateRelation">
    <subDSOf name="SemanticRelation"/>
    <attrDecl name="type"><fixed>Semantic State</fixed></attrDecl>
</DSType>
```

Annex B: Instantiation of the Archive DS

```
<!-- Examples in Figure 2 -->
<GenericAVDS>
    <MMIndexDS>
        <Cluster id="0">
            <!-- Descriptors -->
            <FeatureSpace NumberDimensions="3">
                <FeatureDimension id=
                "color">Color</FeatureDimension>
                <FeatureDimension id=
                "shape">Shape</FeatureDimension>
                <FeatureDimension id=
                "file_size">FileSize</FeatureDimension>
            </FeatureSpace>
            <FeatureBoundingBox>
                <FeatureSpacePoint>
                    <DimensionOrdinate dimension="color"/>
                    <DimensionOrdinate dimension="shape"/>
                    <DimensionOrdinate dimension="file_size"/>
                </FeatureSpacePoint>
            </FeatureBoundingBox>
            <FeatureSpaceElementTypes>
                <ElementType name="StillRegion">
                    <Percentage>80%</Percentage>
                </ElementType>
                <ElementType name="MovingRegion">
                    <Percentage>20%</Percentage>
                <ElementType>
            </FeatureSpaceElements>
            <!-- Relationships -->
            <ClusterElements>
                <ClusterNode>
                    <StillRegionDS id="reg1"/>
                    <StillRegionDS id="reg2"/>
                    <MovingRegionDS id="reg3"/>
                </ClusterNode>
            </ClusterElements>
            <ClusterDecomposition>
                <ClusterNode>
                    <Cluster id="1"><!-- Cluster 1 description -->
                    </Cluster>
                    <Cluster id="2">
                        <!-- Cluster 2 description -->
                        <ClusterDecomposition>
                            <ClusterNode>
                                <Cluster id="2.1"></Cluster>
                                <Cluster id="2.2"></Cluster>
                                <Cluster id="2.3"></Clusler>
                            </ClusterNode>
                        </ClusterDecomposition>
                    /<Cluster>
```

Annex B: Instantiation of the Archive DS

```
                    <Cluster id="3"><!-- Cluster 3
                    description --></Cluster>
                </ClusterNode>
            </ClusterDecomposition>
        </Cluster>
    </MMIndexDS>
</GenericAVDS>
<!-- Examples in Figure 3 -->
<GenericAVDS>
    <MMIndexDS>
        <Cluster id="Subject">
            <!-- Descriptors -->
            <FeatureSpace NumberDimensions="1">
                <FeatureDimension id=
                "subject">Subject</FeatureDimension>
            </FeatureSpace>
            <FeatureSpaceElementTypes>
                <ElementType name="StillRegion">
                    <Percentage>80%</Percentage>
                </ElementType>
                <ElementType name="MovingRegion">
                    <Percentage>20%</Percentage>
                </ElementType>
            </FeatureSpaceElements>
            <!-- Relationships -->
            <ClusterElements>
                <ClusterNode>
                    <StillRegionDS id="reg1"/>
                    <StillRegionDS id="reg2"/>
                    <MovingRegionDS id="reg3"/>
                </ClusterNode>
            </ClusterElements>
            <LexicalRelation type="Meronymy" name=
            "To be the Whole of">
                <ClusterNode>
                    <Cluster id="Science"></Cluster>
                    <Cluster id="History"></Cluster>
                    <Cluster id="Art">
                        <!-- Cluster "Art" description --->
                        <LexicalRelation type="Meronymy"
                        name="To be
the Whole of">
                            <ClusterNode>
                                <Cluster id="Moder"></Cluster>
                                <Cluster id="Expres"></Cluster>
                                <Cluster id="Impres"></Cluster>
                            </ClusterNode>
                        </LexicalRelation>
                    </Cluster>
                </ClusterNode>
            </LexicalRelation>
        </Cluster>
    </MMIndexDS>
</GenericAVDS>
```

What is claimed is:

1. A method of describing the content of a multimedia archive, having records and record descriptions associated with the records, comprising:

evaluating the record descriptions to identify cluster attributes and cluster relationships in a plurality of records in the archive; wherein the cluster attributes are selected from the group including feature space attributes, semantic attributes, media attributes and meta attributes; and generating an archive description record including at least one cluster describing at least one common cluster attribute and at least one cluster relationship in at least two records.

2. The method of describing the content of a multimedia archive of claim 1, further comprising the step of indexing, the cluster attributes are indexed in accordance with an information-based hierarchy.

3. The method of describing the content of a multimedia archive of claim 2, wherein feature space attributes are indexed above semantic attributes in the information-based hierarchy.

4. The method of describing the content of a multimedia archive of claim 2, wherein the feature space attributes are selected from the group consisting of type/technique attributes, global distribution attributes, local structure attributes and global composition attributes.

5. The method of describing the content of a multimedia archive of claim 2, wherein the semantic attributes are selected from the group consisting of generic object attributes, generic scene attributes, specific object attributes, specific scene attributes, abstract object attributes and abstract scene attributes.

6. The method of describing the content of a multimedia archive of claim 2, wherein the information-based hierarchy is a ten level index structure having a plurality of feature space levels and a plurality of semantic attribute levels, wherein the feature space attribute levels include a type/technique attribute level, a global distribution attribute level, a local structure attribute level and a global composition attribute level and wherein the semantic attribute levels include generic object attribute level, a generic scene attribute level, a specific object attribute level, a specific scene attribute level, an abstract object attribute level and an abstract scene attribute level.

7. The method of describing the content of a multimedia archive of claim 1, wherein the cluster includes at least one cluster relationship.

8. The method of describing the content of a multimedia archive of claim 7 wherein the cluster relationships are selected from the group consisting of feature space relationships, semantic relationships, media relationships and meta relationships.

9. The method of describing the content of a multimedia archive of claim 8 wherein the feature space relationships are selected from the group consisting of spatial relationships, temporal relationships and visual relationships.

10. The method of describing the content of a multimedia archive of claim 8 wherein the semantic relationships are selected from the group consisting of lexical relationships and predictive relationships.

11. A system for generating a multimedia archive description Comprising:
   a digital storage subsystem for storing multimedia records and descriptions of the records in accordance with a media description scheme;
   a computer processor operatively coupled to the digital storage subsystem, the computer processor accessing the record descriptions and identifying at least one cluster from the multimedia record descriptions of at least two media records, extracting at least one cluster attribute and at least one cluster relationship from the at least one cluster, the processor generating an archive description record including said at least one cluster, said at least one cluster attribute and said at least one cluster relationship, wherein the cluster attributes are selected from the group including feature space attributes, semantic attributes, media attributes and meta attributes; and archive description storage operative coupled to the computer processor for storing the archive description record.

12. The system for generating a multimedia archive description of claim 11, wherein the at least one cluster attribute is indexed in accordance with a multi-level indexing hierarchy.

13. The system for generating a multimedia archive description of claim 12, wherein the multi-level indexing hierarchy is a ten level index structure having a plurality of feature space levels and a plurality of semantic attribute levels, wherein the feature space attribute levels include a type/technique attribute level, a global distribution attribute level, a local structure attribute level and a global composition attribute level and wherein the semantic attribute levels include generic object attribute level, a generic scene attribute level, a specific object attribute level, a specific scene attribute level, an abstract object attribute level and an abstract scene attribute level.

14. The system for generating, a multimedia archive description of claim 11, wherein the feature space attributes are selected from the group including type/technique attributes, global distribution attributes, local structure attributes and global composition attributes.

15. The system for generating a multimedia archive description of claim 11, wherein the semantic attributes are selected from the group consisting of generic object attributes, generic scene attributes, specific object attributes, specific scene attributes, abstract object attributes and abstract scene attributes.

16. The system for generating a multimedia archive description of claim 11, wherein the at least one cluster relationship is selected from the group consisting of feature space relationships, semantic relationships, media relationships and meta relationships.

17. The system for generating a multimedia archive description of claim 16, wherein the feature space relationships are selected from the group consisting of spatial relationships, temporal relationships, and visual relationships.

18. The system for generating a multimedia archive description of claim 16, wherein the semantic relationships are selected from the group consisting of lexical relationships and predictive relationships.

19. The system for generating a multimedia archive description of claim 16, wherein the feature space relationships are selected from the group including generic relationships and specific relationships.

20. The system for generating a multimedia archive description of claim 16, wherein the semantic relationships are selected from the group including generic relationships, specific relationships and abstract relationships.

21. The system for generating a multimedia archive of claim 11, wherein the digital storage subsystem includes local computer readable storage for multimedia records, multimedia record descriptions and the archive description record.

22. The system of claim 11, wherein the digital storage subsystem includes a plurality of storage devices interconnected by a computer network.

23. The system for generating a multimedia archive description of claim 11, wherein the media attributes are selected from the group including format, storage, file identification and file location attributes.

24. The system for generating a multimedia archive description of claim 11, wherein the meta attributes are selected from the group including creation, representative icon and intellectual property right attributes.

25. A media archive system comprising:
   a computer readable storage system for storing a plurality of media records;
   at least one media description engine, said media description engine accessing a media record stored in the computer readable storage system and generating a media description record corresponding thereto; a cluster processor operatively coupled to the computer readable storage system, the cluster processor accessing the media description records and generating an archive description record, the archive description record including at least one cluster which relates at least two records in the storage system each said at least one cluster being defined at least in part by a cluster attribute and a cluster relationship of the media description records, wherein the cluster attributes are selected from the group consisting of feature space attributes, semantic attributes, media attributes and meta attributes; and a query processor operatively coupled to the cluster processor, the query processor receiving archive search parameters from a user and providing a search query to the cluster processor.

26. The media archive system of claim 25, wherein the cluster attributes are indexed in accordance with an information-based hierarchy.

27. The media archive system of claim 26, wherein feature space attributes are indexed above semantic attributes in the information-based hierarchy.

28. The media archive system of claim 27, wherein the feature space attributes are selected from the group consisting of type/technique attributes, global distribution attributes, local structure attributes and global composition attributes.

29. The media archive system of claim 27, wherein the semantic attributes are selected from the group consisting of generic object attributes, generic scene attributes, specific object attributes, specific scene attributes, abstract object attributes and abstract scene attributes.

30. The media archive system of claim 27, wherein the information-based hierarchy is a ten level index structure having a plurality of feature space levels and a plurality of semantic attribute levels, wherein the feature space attribute levels include a type/technique attribute level, a global distribution attribute level, a local structure attribute level and a global composition attribute level and wherein the semantic attribute levels include generic object attribute level, a generic scene attribute level, a specific object attribute level, a specific scene attribute level, an abstract object attribute level and an abstract scene attribute level.

31. The media archive system of claim 25, wherein the cluster relationships are selected from the group consisting of feature space relationships, semantic relationships, media relationships and meta relationships.

32. The media archive system of claim 31, wherein the feature space relationships are selected from the group including spatial relationships, temporal relationships, and visual relationships.

33. The media archive system of claim 31, wherein the semantic relationships are selected from the group consisting of lexical relationships and predictive relationships.

34. An archive description file defined in computer readable media for describing the content of a multimedia archive, having records and record descriptions associated with the records, comprising: at least one cluster attribute and at least one cluster relationship describing at least one cluster in the record descriptions, wherein the cluster attributes are selected from the group consisting of feature space attributes, semantic attributes, media attributes and meta attributes; and a collection index structure relating the clusters to the records.

35. The archive description file for describing the content of a multimedia archive of claim 34, wherein the cluster attributes are indexed in accordance with an information-based hierarchy.

36. The archive description file for describing the content of a multimedia archive of claim 35, wherein feature space attributes are indexed above semantic attributes in the information-based hierarchy.

37. The archive description file for describing the content of a multimedia archive of claim 35, wherein the feature space attributes are selected from the group including type/technique attributes, global distribution attributes, local structure attributes and global composition attributes.

38. The archive description file for describing the content of a multimedia archive of claim 35, wherein the semantic attributes are selected from the group consisting of generic object attributes, generic scene attributes, specific object attributes, specific scene attributes, abstract object attributes and abstract scene attributes.

39. The archive description file for describing the content of a multimedia archive of claim 35, wherein the information-based hierarchy is a ten level index structure having a plurality of feature space levels and a plurality of semantic attribute levels, wherein the feature space attribute levels include a type/technique attribute level, a global distribution attribute level, a local structure attribute level and a global composition attribute level and wherein the semantic attribute levels include generic object attribute level, a generic scene attribute level, a specific object attribute level, a specific scene attribute level, an abstract object attribute level and an abstract scene attribute level.

40. The archive description file for describing the content of a multimedia archive of claim 39, wherein the cluster relationships are selected from the group including feature space relationships, semantic relationships, media relationships and meta relationships.

41. The archive description file for describing the content of a multimedia archive of claim 40, wherein the feature space relationships are selected from the group including spatial relationships, temporal relationships, and visual relationships.

42. The archive description file for describing the content of a multimedia archive of claim 40, wherein the semantic relationships are selected from the group including lexical relationships and predictive relationships.

* * * * *

UNITED STATES PATENT AND TRADEMARK OFFICE
CERTIFICATE OF CORRECTION

| | |
|---|---|
| PATENT NO. | : 6,941,325 B1 |
| APPLICATION NO. | : 09/889859 |
| DATED | : September 6, 2005 |
| INVENTOR(S) | : Benitez et al. |

Page 1 of 1

It is certified that error appears in the above-identified patent and that said Letters Patent is hereby corrected as shown below:

On Page 1, Column 1, line 16, please insert the following header and paragraph:

-- Statement Regarding Federally Sponsored Research or Development
This invention was made with government support under grant number 8811111 awarded by the National Science Foundation. The government has certain rights in the invention. --

Signed and Sealed this

Twenty-fourth Day of June, 2008

JON W. DUDAS
*Director of the United States Patent and Trademark Office*